US011427890B2

(12) United States Patent
Gummert et al.

(10) Patent No.: US 11,427,890 B2
(45) Date of Patent: Aug. 30, 2022

(54) LUBRICANT-COMPATIBLE COPPER ALLOY

(71) Applicant: Otto Fuchs Kommanditgesellschaft, Meinerzhagen (DE)

(72) Inventors: Hermann Gummert, Viersen (DE); Björn Reetz, Krefeld (DE); Thomas Plett, Schmallenberg (DE)

(73) Assignee: OTTO FUCHS KOMMANDITGESELLSCHAFT, Meinerzhagen (DE)

( * ) Notice: Subject to any disclaimer, the term of this patent is extended or adjusted under 35 U.S.C. 154(b) by 292 days.

(21) Appl. No.: 16/586,949

(22) Filed: Sep. 28, 2019

(65) Prior Publication Data
US 2020/0024694 A1    Jan. 23, 2020

Related U.S. Application Data

(63) Continuation of application No. 15/104,437, filed as application No. PCT/EP2015/052229 on Feb. 4, 2015, now abandoned.

(30) Foreign Application Priority Data

Feb. 4, 2014   (DE) .................... 10 2014 101 343.3

(51) Int. Cl.
| | |
|---|---|
| C22C 9/01 | (2006.01) |
| F16C 33/12 | (2006.01) |
| F16D 23/02 | (2006.01) |
| C22C 9/04 | (2006.01) |
| C22F 1/08 | (2006.01) |
| F16H 57/00 | (2012.01) |
| F16C 33/10 | (2006.01) |

(52) U.S. Cl.
CPC .................. *C22C 9/01* (2013.01); *C22C 9/04* (2013.01); *C22F 1/08* (2013.01); *F16C 33/12* (2013.01); *F16D 23/025* (2013.01); *F16H 57/00* (2013.01); *F16C 33/1025* (2013.01); *F16C 2204/10* (2013.01); *F16C 2204/14* (2013.01); *F16C 2361/61* (2013.01)

(58) Field of Classification Search
CPC ...................................................... C22C 9/01
See application file for complete search history.

(56) References Cited

U.S. PATENT DOCUMENTS

| | | | |
|---|---|---|---|
| 3,923,500 A | 12/1975 | Kitazawa et al. | |
| 4,874,439 A | 10/1989 | Akutsu | |
| 4,995,924 A | 2/1991 | Akutsu | |
| 5,114,468 A | 5/1992 | Akutsu et al. | |
| 5,183,637 A | 2/1993 | Tanaka et al. | |
| 5,246,509 A | 9/1993 | Kato et al. | |
| 5,326,646 A | 7/1994 | Nakashima et al. | |
| 5,337,872 A | 8/1994 | Kawamura et al. | |
| 6,793,468 B2 | 9/2004 | Ojima et al. | |
| 8,435,361 B2 | 5/2013 | Gaag et al. | |
| 2008/0219881 A1 | 9/2008 | Gaag | |
| 2008/0240973 A1* | 10/2008 | Gaag | ......................... C22F 1/08 |
| | | | 420/480 |
| 2009/0022620 A1 | 1/2009 | Weber | |
| 2009/0092517 A1 | 4/2009 | Kosaka et al. | |
| 2011/0211781 A1 | 9/2011 | Toda et al. | |
| 2012/0020600 A1 | 1/2012 | Nishimura et al. | |
| 2013/0330227 A1 | 12/2013 | Gaag et al. | |
| 2014/0259674 A1 | 9/2014 | Zhu et al. | |
| 2016/0348215 A1 | 12/2016 | Gummert et al. | |
| 2017/0051385 A1 | 2/2017 | Gummert et al. | |
| 2017/0145549 A1 | 5/2017 | Plett et al. | |
| 2019/0017149 A1 | 1/2019 | Plett et al. | |
| 2019/0093195 A1 | 3/2019 | Gummert et al. | |

FOREIGN PATENT DOCUMENTS

| | | |
|---|---|---|
| CH | 223580 A | 12/1942 |
| CN | 1092817 A | 9/1994 |
| CN | 101709405 A | 5/2010 |
| CN | 102251142 A | 11/2011 |
| CN | 103589903 A | 2/2014 |
| CN | 103602998 A | 2/2014 |
| DE | 1558817 A1 | 4/1970 |
| DE | 1558467 A1 | 7/1970 |
| DE | 2718495 A1 | 11/1978 |

(Continued)

OTHER PUBLICATIONS

Office Action dated Dec. 11, 2019 in related Indian application 201627024408.

Zhang Sheng-Hua et al: "Microstructure and wear properties of some special brasses", Jixie Gongcheng Cailao—Materials for Mechanical Engineering. Jixie Gongyebu Shanghai Cailiao Yanjiusuo. Shanghai. CN. vol. 28. No. 6. Jun. 30, 2004 (Jun. 30, 2004). pages 35-38. XP009175887. ISSN: 1000-3738. Entire article.

Weber K et al: "Neuer Pb-freier 1,2,5 Kupferwerkstoff fuer Gleitlageranwendungen in Verbrennungsmotoren und Getrieben", Metall : Fachzeitschrift Für Metallurgie; Technik, Wissenschaft, Wirtsc, GDMB-Verag, Clausthal-Zellerfeld, DE, Bd. 63, Nr. 11, Nov. 1, 2009 (Nov. 1, 2009), Seiten 564-567, XP009157102, ISSN: 0026-0746. 4 pages.

(Continued)

*Primary Examiner* — Jophy S. Koshy
(74) *Attorney, Agent, or Firm* — Polson Intellectual Property Law, PC; Margaret Polson; Christopher Sylvain

(57) ABSTRACT

A copper alloy having a high corrosion resistance for a wide range of different lubricants, in particular different base oils and a variation of lubricant additives. The property of a low corrosion tendency for different tribological systems is also combined with good mechanical properties, and a high strength in particular. The alloy has a low wear and coefficient of friction. The lubricant-compatible copper alloy is suitable for producing components that come in contact with lubricant and are exposed to friction stresses, such as gear components, for example synchronizer rings. A method for manufacturing such components and a gear having at least one such component is also disclosed.

15 Claims, 2 Drawing Sheets

(56) References Cited

FOREIGN PATENT DOCUMENTS

| | | |
|---|---|---|
| DE | 4101620 A1 | 7/1991 |
| DE | 4240157 A1 | 6/1994 |
| DE | 19908107 A1 | 8/2000 |
| DE | 102005059391 A1 | 6/2007 |
| EP | 0407596 A1 | 1/1991 |
| EP | 0709476 A1 | 5/1996 |
| EP | 0872565 A1 | 10/1998 |
| EP | 1281838 A2 | 2/2003 |
| EP | 1712648 A2 | 10/2006 |
| EP | 2135964 A2 | 12/2009 |
| JP | S52155128 A | 12/1977 |
| JP | 56-127741 A | 10/1981 |
| JP | S60162742 A | 8/1985 |
| JP | S61117240 A | 6/1986 |
| JP | 2001355029 A1 | 12/2001 |
| JP | 2009007673 A | 1/2009 |
| RU | 2007145286 A | 6/2009 |
| WO | 2015117972 A1 | 8/2015 |
| WO | 2015173291 A2 | 11/2015 |

OTHER PUBLICATIONS

Kurbatkin I I et al: "Effect of 1-5composition on the structure and properties of complex brasses used in the automotive industry", Cvetnye Metally (Tsvetnye Meta, Moskva : Gos. Ob'Edinnoe Nauä No-Technlä Eskoe Izdat, Nr. 3, Jan. 1, 1994 (Jan. 1, 1994), Seiten 44-46, XP009186304, ISSN: 0372-2929. 4 pages.

\* cited by examiner

LUBRICANT-COMPATIBLE COPPER ALLOY

BACKGROUND

The present disclosure relates to a lubricant-compatible copper alloy which is suitable in particular for producing gear components that come in contact with lubricant and are exposed to friction stresses, such as synchronizer rings, as well as a method for manufacturing such gear components and a gear having such gear components.

The entire tribological system must be taken into account for the development of a copper alloy for manufacturing workpieces or components, such as synchronizer rings for example, that are exposed to oil and to friction stresses so that they will have an improved corrosion resistance. This involves the composition of the lubricant, in particular the additives contained in it, as well as the material of the opposing friction surface, and the layers of alloy near the surface. Furthermore, the local temperature distribution established in the case of friction stress and the aging behavior of the lubricant have an influence on the wear due to corrosion.

Under a friction stress, an adsorption layer consisting primarily of lubricant additives is formed after only a brief contact time with a lubricant under a frictional load. In the case of a thermomechanical load, a reactive layer develops beneath the adsorption layer comprised of components of the adsorption layer and alloy constituents near the surface reacting with one another. In this process, the adsorption layer and the reaction layer form an outer boundary layer on the copper alloy workpiece, beneath which there is an internal boundary layer several micrometers thick. Because of the proximity to the outer boundary layer, this internal layer is influenced by the mechanical load acting on the surface as well as by the chemical transformation processes taking place in the reaction layer. Diffusion processes and oxidation processes involving the substrate alloy can also influence the formation of the reaction layer in the region of the internal boundary layer.

Many lubricants contain additives, such as additives that contain sulfur and phosphorus, that can have a corrosive effect under the corresponding thermomechanical load due to friction contact, which in turn causes a not insignificant reduction in the lifetime of the workpiece. Copper alloys have already been proposed for reducing the corrosive effect of sulfur constituents in a lubricant. JP S 60162742 A describes a copper alloy for the bearing of a turbocharger which consists of 57-61% Cu, 2.5-3.5% Pb, based on the amounts by weight, where Fe and Zn may be present as impurities. A stable CuS layer is said to develop on the friction surface.

EP 0 872 565 A1 describes how sulfur corrosion of a copper alloy can be reduced by introducing, in addition to Cu and Zn, a nickel component in the amount of 10-70% by weight as well as an oxidizable alloy ingredient (Zn, Mn, Al and Si) into the alloy. An oxide layer is said to suppress the development of a copper sulfide layer. EP 1 281 838 A2 discloses that corrosion due to a sulfur content in lubricating oil can be counteracted by a selected Cu/Zn ratio. In addition, Mn, Al, Si are added to improve the hardness of the alloy, with mainly crystallized manganese-silicide hard phases being formed. Therefore, it is preferable to use a large amount of Mn alloy of up to 7% in this previously known alloy. JP S 61117240 A proposes a copper alloy with weight amounts of 54-64% Cu, 0.5-3% Si, 0.5-2% Al, 3-7% Mn and the remainder Zn, in which hard phase precipitation is present in the form of manganese silicides. The alloy reduces the formation of copper sulfide layers so that it has a lower corrosion tendency as a bearing material for a turbocharger at high exhaust temperatures.

Furthermore, DE 41 01 620 C2 describes a copper alloy with a reduced corrosion tendency with respect to lubricating oils that contain sulfur. The alloy composition consists of 11.5-25% by weight Zn, 5-18% by weight Pb, 1-3.5% by weight Mn, 0.3-1.5% by weight Si. In the structure consisting of a pure a phase, the lead content is uniformly distributed. In addition, the silicon and manganese alloy constituents are added so that they are present in a stoichiometric ratio to form manganese silicides to prevent free silicon from crystallizing out, which would thus cause embrittlement.

For workpieces that are exposed to friction stresses, such as synchronizer rings for example, hard phase precipitation reinforces the surface hardness and therefore reduces the extent of wear. In the tribological system with the lubricant, hard phase precipitation in the area near the surface, which presents the greatest resistance to wear and smoothing processes, form spatially limited areas with a high mechanical stress, where high temperatures may occur locally. Processes of formation and decomposition of the reaction layer are accelerated in these areas of the component that are exposed to particularly high thermal loads, so that hard phase precipitation may be problematic from the standpoint of corrosion. It should be pointed out here that in the case of hard phase precipitation in the form of coarse grains under mechanical loads, large sections of the inner and outer boundary layers are under mechanical stress, which in turn increases pitting corrosion.

To counteract such processes, U.S. Pat. No. 6,793,468 B2 proposes a copper alloy containing 54-64% by weight Cu, 0.2-3% by weight Si, 0.2-7% by weight Mn, 0.5-3.5% by weight Al and the remainder Zn, with crystalline manganese silicides being present as elongated aligned structures in the copper alloy matrix. To achieve these goals, the alignment of the hard phases must be provided in the axial direction with respect to a rotating shaft to be supported and/or the opposing body. For a further development of this concept, DE 10 2011 004 856 A1 proposes that the formation of a load-bearing sulfide film be accelerated, because this prevents the seizing of an opposing surface sliding on it when in contact with hot lubricating oil. A copper alloy which is used for this purpose contains 25-45% by weight Zn, 0.3-2% by weight Si, 1.5-6% by weight Mn and the remainder copper, in which crystalline manganese silicide compounds are present in an oriented arrangement. The density of these precipitates is selected so that there is an average inter-grain spacing of 5-30 μm, which leads to thermal stress on the joint when it comes in contact with the hot lubricating oil, thereby accelerating the development of the desired sulfide film at the surface of the component.

With regard to an improved corrosion resistance of a component that is subject to friction stress, the influence of the individual alloy ingredients of the substrate on the composition and the microscopic structure of the internal boundary layer adjacent to the reaction layer is relevant. In this regard, EP 0 709 476 B1 proposes a sintered copper alloy as a friction material in a lubricant environment which includes the present phosphorus and sulfur components, where intermetallic hard phases are formed, selected from FeMo, FeCr, FeTi, FeW, FeB and $Al_2O_3$. In addition, there is a porous structure with an average pore diameter of at least 30 μm, which is present in an amount of at least 20% by volume. The alloy consists of 5-40% by weight Zn, 5-40% by weight Ni, 1-5% by weight Si, 0.1-5% by weight Al, 0.5-3% by weight Pb and preferably Sn in an amount of 3-20% by weight with the remainder being copper. The formation of copper sulfide is suppressed by the large amounts of zinc and nickel. Furthermore, nickel silicides which improve the coefficient of friction are also formed.

Additional copper-zinc alloys are described in DE 10 2005 059 391 A1, DE 42 40 157 A1 or CH 223 580. These alloys are used to produce brass components used in an oil environment such as synchronizer rings, for example. These alloys are formulated so that the silicon they contain will completely enter into the formation of silicides. Since manganese is a preferred substance for forming silicide, the amounts of manganese specified in the exemplary alloys are accordingly high and usually greatly exceed 2% by weight. The silicon content is adjusted to conform to the silicide-forming portions and is involved with max. 1% by weight in the exemplary alloy specified in the documents referenced above.

In many cases, additives are added to lubricants with the goal of reducing corrosion on a friction surface and thereby reducing the wear due to abrasion. One example of such a corrosion inhibitor (anti-wear active ingredient) is zinc dialkyl dithiophosphate. A phosphate glass that protects the surface of the reaction layer is formed from this additive in the reaction layer. This ideally involves an exchange of the ligands of the additive with alloy elements as well as an incorporation of substrate cations so that a durable reaction layer is formed. However, the reaction processes that protect the surface depend on the composition of the internal boundary layer of the substrate material. Furthermore, additional additives have an influence on the process and under some circumstances act as protective additives, which protect the surface competitively with respect to adhesion in the adhesion layer. The alloy structure and the thermal processes taking place in the reaction layer with regard to the dissipation of heat and local temperature peaks are also important for layer buildup and decomposition processes. Therefore, depending on the respective tribological system, the involvement of corrosion inhibitors may even lead to an unwanted chemical decomposition process involving the friction layer under some circumstances. The corrosion-resistant copper alloys known so far are therefore adapted individually to a very specific lubricant system.

If there is a change in the additive composition in the lubricant, the entire tribological system is affected, which then in turn influences the interacting chemical reactions at the metal surface of the friction partners. Therefore, the formation of the reaction layer can also be influenced not only by such additives that are added to the lubricant with the goal of altering the surface of the friction surface, but also by those added primarily for the purpose of protecting or improving the base oil. In addition, there is the possibility of an effect on lubricant aging processes. Oxidation processes operative or decomposition processes involving additives may then occur, influencing the exchange with the adsorption layer on the friction surface in addition to the uptake of wear particles.

In addition to a change in the additive composition, replacing the base oil of the lubricant also results in a fundamental change in the tribological system. At the present time, mainly base oils in the form of mineral oils, hydrocracking oils or synthetic oils such as poly-α-olefins or esters are being used for lubricants that are modified to be used as gear oils. To meet the requirement for a biocompatible lubricant, replacement of the base oil with vegetable oils or animal fats can lead to fundamental changes in the adhesion properties because vegetable oils typically have a high polarity and thus promote an affinity for a metal surface. The changes in the tribological system caused by the change in the lubricant, in particular its base oil, so far mostly result in the necessity for adjusting the alloy composition of the friction partners in order to maintain the corrosion-preventing effect.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

The present disclosure relates to a copper alloy having a high corrosion resistance for a wide range of different lubricants, in particular different base oils and a variation of lubricant additives. The property of a low corrosion tendency for different tribological systems should be combined with good mechanical properties. The alloy must in particular have a high strength. Furthermore, it should have low wear and should in particular have a coefficient of friction that is as adaptive as possible for use as a synchronizer ring in a friction pairing with steel.

This is achieved according to the present disclosure by a copper alloy containing the following (amounts given in % by weight):

| | |
|---|---|
| 54-65% | copper |
| 2.5-5.0% | aluminum |
| 1.0-3.0% | silicon |
| 2.0-4.0% | nickel |
| 0.1-1.5% | iron |
| ≤1.5% | manganese |
| ≤1.5% | tin |
| ≤1.5% | chromium |
| ≤0.8% | lead |
| remainder | zinc plus other unavoidable contaminants, | wherein free silicon is present in the alloy matrix, or in non-silicide phases that contain silicon, in the amount of at least 0.4%, preferably at least 0.5% and especially preferably at least 0.6%.

When unavoidable contaminants are mentioned in the context of this description, it should be pointed out that these are elements introduced into the melt by using recycled material, wherein each element that is to be regarded as a contaminant must not exceed a maximum amount of 0.5% by weight and the sum total of contaminants must not exceed 1.5% by weight. Preferably, one should attempt to minimize the contaminants based on the materials and in the sum total.

BRIEF DESCRIPTION OF THE DRAWINGS

The present disclosure is described in greater detail below with reference to the following figures.

Figure 1:
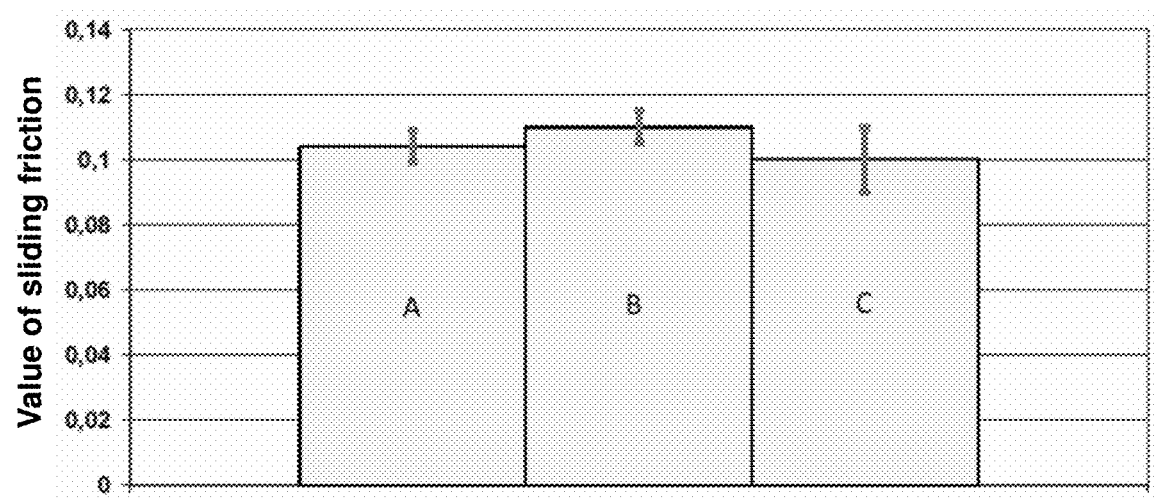
FIG. 1 shows sliding friction values measured using semi-finished products produced from an alloy according to the present disclosure in three different lubricants A (titanium EG 52512), B (BOT 350 M3) and C (BOT 402)

In addition to the aspects and embodiments described above, further aspects and embodiments will become apparent by reference to the accompanying drawings and the detailed description forming a part of this specification.

DETAILED DESCRIPTION

The disclosed alloy—a special brass alloy—and/or the workpiece manufactured from it, e.g. a synchronizer ring, is/are characterized by a high oil compatibility for a wide range of lubricant systems. It has been recognized that the alloy forms particularly stable reaction layers in different tribological systems under the influence of friction and thermal stress, with leveling and abrasion processes involving the inner boundary layer being substantially retarded. Stabilization of the boundary layer results for the selected ratio between the alloy constituents Si, Cu and Zn. The ratio of the amount of free silicon in comparison with the sum of the alloy constituents copper and zinc is of particular importance. In one embodiment, a component produced from the alloy has a reaction layer on an outer surface of the component with free silicon present as a reactive element in the alloy matrix or in silicon-containing non-silicide phases. According to a further development, the component is arranged in a gear oil and the component has a reaction layer on a surface which is exposed to friction, with additives present in the gear oil and free silicon present as a reactive element in the alloy matrix or in silicon-containing non-silicide phases or reaction products and/or decomposition products thereof.

The effect of the zinc component is seen as stabilizing the reaction layer by making available a sufficient reactivity for rapid formation of a layer and healing. An effect somewhat to the contrary is achieved by the silicon component. It is important here for free silicon that is not bound in silicides to be present in dissolved form in the matrix or in silicon-containing non-silicide phases in a weight amount of at least 0.4%. The advantageous effect here already occurs when the free silicon content is above the threshold of individual contaminants of 0.15% by weight. The minimum weight amount of 0.4% leads to a definite stabilization of the reaction layer. An even greater amount of free silicon of preferably at least 0.5%, and in particular preferably at least 0.6%, increases the desired effect on the development of the reaction layer, wherein an upper limit is given by the requirement for processability of the alloy. Silicon-rich γ phases, which yield mechanically unfavorable alloy properties, should be avoided. It is therefore preferable for the amount of free silicon by weight to be limited to max. 2% and especially preferably to max. 1.5%. With the selected limit for the absolute silicon content, stresses in the cast alloy that can lead to cracking under some circumstances are suppressed, and an advantageous breaking strength of the alloy is maintained.

In addition, it is preferable for the weight ratio between the alloy constituent zinc and the absolute silicon content to be in the range of 10-40 and preferably in the range of 20-35. If the zinc content relative to the amount of free silicon in the alloy matrix is taken into account, the quotient is preferably between 15 and 75 and preferably between 20 and 55. The balance mentioned below between the component zinc, which increases the reactivity, and the free silicon content, which influences the reaction rate, is adjusted so that the formation of the reaction layer takes place selectively with regard to the lubricant additives involved.

Silicon in free form acts as an inhibitor of oxidation of other alloy constituents, and in particular reduces the oxidation tendency of zinc so that zinc oxide layers are formed only to a minor extent and instead zinc is present in elemental form for incorporation into the reaction layer. It is additionally assumed that the free silicon in the special brass reduces the diffusion rate of third elements and also reduces the heat transfer within the alloy. This influences the kinetics of the formation of the reaction layer to the extent that the synthesis processes are retarded while at the same time taking place more selectively. Instead of the formation of an oxide layer with a high zinc oxide content, a slowly growing and stable reaction layer is formed, in which the elemental zinc that is available as a reactant will react selectively with individual additives of the lubricating oil, while most of the oil additives known at the present time are incorporated into the reaction layer only to a lesser extent. Therefore, the development of the reaction layer is not suppressed entirely, but instead a selective layer growth occurs due to the increased reactivity because of the zinc content and the inhibitor effect of the dissolved free silicon in the matrix or silicon-based phases.

This interaction results in the fact that only very specific lubricant additives having surface-altering effects influence the buildup of the reaction layer. This explains the broadband nature of the corrosion resistance of the workpieces produced from the alloy according to the present disclosure, for example synchronizer rings, because most oil additives can be used and replaced without having a negative effect on the layer-forming process. To this extent, the tribological system remains more or less unchanged for workpieces made of the alloy according to the present disclosure, for example synchronizer rings, with respect to the reaction layer for a variety of lubricant variations. For use in different lubricant environments, one need only ensure that specific additives or additive compositions that could have a negative effect on the tribological system are not used. Whereas only very specific lubricants can be used with workpieces of alloys known in the past, in the case of workpieces made of the alloy according to the present disclosure, there are only a few lubricants and/or lubricant compositions with which the intended success cannot be achieved. Therefore, the workpieces produced from the alloy according to the present disclosure have broadband compatibility with oil.

For workpieces made of the alloy according to the present disclosure, wear on the outermost layer subject to mechanical stress is accepted to form the reaction layer, so that the stable reaction layer is formed. This is in contrast with the usual procedure for reducing wear, even initial wear. In the investigations that have led to the present disclosure, it was found that in order to obtain a stable reaction layer, it is not only necessary to control the growth of the layer, including the layer thickness and the composition of the layer, but stabilization of the internal boundary layer adjacent to the reaction layer is also important from the standpoint of stable formation of the reaction layer of the component. By adding silicon, an improved mechanical stability of the boundary layer is observed, increasing in particular the resistance to pitting wear. This effect is additionally enhanced by the precipitation of intermetallic hard phases, so that for the alloy according to the present disclosure, there may be a mixture of silicides and aluminides containing only silicon and/or aluminum but also the alloy constituents manganese, iron and nickel as well as the optional element chromium. The selected aluminum content in the alloy results in the formation of primarily aluminum intermetallic phases, thus the elements that are otherwise necessary for the formation of silicide are captured. As a result, a silicon content remains as an excess and may be present as free silicon dissolved in the alloy matrix. The weight ratio of the alloy contents is adjusted in a preferred embodiment, so that the aluminum content exceeds the stoichiometric ratio for the sum of the iron, manganese, nickel and chromium contents. In one embodiment, a ratio of the sum of the elements Ni+Fe+Mn to Si is ≤3.45 and ≥0.7. According to a further development, the ratio is ≤3.25 and ≥0.7

The required minimum amount of 0.4%, preferably at least 0.5% and especially preferably at least 0.6% free silicon is derived for the present multi-component system not only through a sufficiently large amount of aluminum, so that aluminides are formed in competition with silicides, but also another influencing factor on the solubility of silicon leads to the adjustment of the alloy structure which can be controlled through the absolute zinc content. If there is only or predominantly a β-brass, then there is a good solubility for silicon in the alloy matrix. Within the predetermined alloy limits, combination amounts are possible in which the α phase is thermodynamically stable below 600° C. and in which free silicon is soluble only to a lesser extent than in the β phase. Likewise, the required minimum amount of 0.4%, preferably at least 0.5% and especially preferably at least 0.6% free silicon is established by the fact that a β phase content is frozen into the alloy due to the selected cooling conditions after melting of the alloy and possibly additional heat-forming and annealing steps.

Another control possibility for the solubility of silicon in the alloy matrix is also obtained in the case of a structural adjustment for which a κ phase in the form of a Cu—Zn—Al—Si mixed crystal is present in the form of fine phase precipitations. Due to this measure, silicon can be tapped from a (α+β) mixed crystal. To influence the formation of the κ phase, repeat annealing with controlled cooling may be carried out. In addition, the optional element chromium also influences the phase equilibrium, so that for a preferred embodiment of the alloy, chromium is present only as an unavoidable contaminant.

Cobalt may be present in the alloy in the amount of max. 1.5% by weight. However, an embodiment in which the cobalt content is <0.7% by weight or the alloy is more or less free of cobalt is preferred.

A lead content of max. 0.8% by weight is basically considered to be an impurity. It was surprising to find that the special oil compatibility of the alloy described here is also achieved even if it is free of Pb. This was surprising against the background that the state-of-the-art alloys must contain a certain amount of Pb in order to achieve oil compatibility. Alloys according to the present disclosure whose Pb content is <0.1% by weight are considered to be free of Pb within the scope of these embodiments.

It was surprising to find that, despite the low manganese content in comparison with previously known alloys of the type in question, a sufficient amount of silicide is formed in the components produced with the alloy according to the present disclosure to impart the required abrasion resistance to the component. This finding was surprising because manganese is a preferred silicide-forming element and the prevailing opinion held that the manganese content must be high quality because of its affinity for the formation of silicide in order to obtain the desired silicide content. With the alloy according to the present disclosure, it has also been possible to introduce other elements into the formation of silicide, such as nickel and/or iron, for example, despite the fact that they have a significantly lower affinity for formation of silicide in comparison with manganese. Against this background, the alloy also contains aluminum as an alloy constituent; aluminides may be formed with the elements iron and/or nickel but the affinity for formation of silicide is predominant.

To this extent, it has been surprisingly possible to not only ensure that the component produced will have a sufficient silicide content, but also ensure that the desired free silicon will also be present, assuming skillful utilization of the different affinities of the elements for silicon. Studies have shown that the desired free silicon is established in the disclosed range only if it is necessary to rely on traditional production processes.

Workpieces produced from the alloy according to the present disclosure ensure the buildup of an internal boundary layer in interaction with the lubricant, which permits good adhesion of reaction layers in addition to providing a high thermal and mechanical stability. It is assumed that this unexpected property is the result of an adapted diffusion capability which has an effect on the layer growth of the reaction layer as well as opening up the possibility of using a self-lubricating component as additional corrosion protection. The addition of tin to the alloy composition serves this purpose as it reaches, through diffusion, the friction surface, where it has a self-lubricating effect.

To produce the alloy according to the present disclosure, a reforming and heat treatment are preferably carried out after bonding the alloy constituents so that a β phase is formed with a matrix content of at least 70% and preferably more than 80%. In one example, the component produced from the alloy is treated with at least one heat treatment step with subsequent cooling such that the amount of free silicon in the alloy matrix or in silicon-containing non-silicide phases is at least 0.4%. According to a further development, process management of the at least one heat treatment step and subsequent cooling creates the β phase content of at least 80%. In addition to the improved solubility of silicon in the alloy matrix, the result is a high workpiece hardness and a great resistance to abrasive wear such that a final precipitation hardening is unnecessary for many applications. In this case, the amount of the optional ingredient cobalt in the alloy may be reduced. It is preferable to omit cobalt entirely except for unavoidable impurities. In this regard, it has surprisingly been found that the broadband oil compatibility of the required alloy composition is further improved with an amount of cobalt of less than 0.7% by weight. It is therefore assumed that in the present multi-component system, there is an interaction between cobalt fractions and iron fractions and also with chromium, which has an indirect effect on the free silicon content.

In one embodiment, an increase in the positive properties of the aforementioned alloy can be achieved with a copper alloy containing the following amounts by weight:

| | |
|---|---|
| 54-65% | copper |
| 3.0-5.0% | aluminum |
| 1.0-3.0% | silicon |
| 2.0-4.0% | nickel |
| 0.5-1.5% | iron |
| ≤1.5% | manganese |
| ≤0.7% | tin |
| ≤1.5% | chromium |
| ≤0.8% | lead |
| remainder | zinc plus other unavoidable impurities, | wherein free silicon is present in an amount of at least 0.4%, preferably at least 0.5% and especially preferably at least 0.6% in the alloy matrix or in silicon-containing non-silicide phases.

In another embodiment, a further improvement in the positive properties of the aforementioned alloy can be achieved with a copper alloy containing the following amounts by weight:

| | |
|---|---|
| 56-60% | copper |
| 3.0-4.0% | aluminum |
| 1.3-2.5% | silicon |
| 3.0-4.0% | nickel |
| 0.5-1.5% | iron |
| 0.1-1.5% | manganese |
| 0.3-0.7% | tin |
| ≤0.7% | chromium |
| ≤0.8% | lead |
| remainder | zinc plus unavoidable impurities, | wherein free silicon is present in the amount of at least 0.4%, preferably at least 0.5% and especially preferably at least 0.6% in the alloy matrix or in silicon-containing non-silicide phases.

Against the background of the advantages of the copper alloy according to the present disclosure described above and/or the workpieces produced from it, it can be seen that this alloy is suitable for producing components that are used in an oil environment such as, for example, synchronizer rings, bearing parts or the like. This means that the positive properties of the products produced from this alloy are achieved not only when the product is a friction partner of a friction pair, such as a synchronizer ring, but also with other components provided in a combination, such as a pairing, for example, a bearing (axial bearing or radial bearing). These additional applications also include bushings used as bearing parts. It is self-evident here that the special properties of the workpieces produced from such an alloy are established in particular when they are exposed to manganese lubrication at least temporarily in their oil environment.

Even if the positive properties described above are established over the entire bandwidth, alloys made of the following composition are preferred for bearing parts because of strength criteria, in particular when the components made of these alloys are to be exposed to higher mechanical loads (amounts given in % by weight):

| | |
|---|---|
| 59-61% | copper |
| 3.5-4.2% | aluminum |
| 1.1-1.7% | silicon |
| 2.6-3.8% | nickel |
| 0.6-1.1% | iron |
| 0.5-1.0% | manganese |
| 0.1-0.3% | tin |
| max. 0.8% | lead |
| remainder | zinc plus unavoidable impurities, | wherein free silicon is present in the amount of at least 0.4%, preferably at least 0.5% and especially preferably at least 0.6% in the alloy matrix or in silicon-containing non-silicide phases.

The experiments presented below were carried out with semi-finished products containing the following alloy components (amounts given in % by weight):

| | |
|---|---|
| 60% | copper |
| 4.0% | aluminum |
| 1.6% | silicon |
| 3.2% | nickel |
| 0.9% | iron |
| 0.9% | manganese |
| 0.2% | tin |
| 0.8% | lead |
| remainder | zinc plus unavoidable impurities. |

The extruded semi-finished products with the above alloy composition investigated here have a great toughness and sufficient strength plus a high elongation at break. Workpieces and/or semi-finished products with a hardness HB of 2.5/62.5 in the range of 250-270 can be obtained. Since this strength level is sufficient for many applications, the workpieces produced from this alloy do not require any subsequent hardening. In the case of workpieces made of previously known alloys, such a hardness can be achieved only with the additional step of hardening. Tensile tests have shown a 0.2% strain limit in the range of 650-750 MPa. In addition, the alloy according to the present disclosure has a sliding friction value of ≥0.1. This is illustrated in FIG. 1, where the A experiments were conducted in the lubricant titanium EG 52512, the B experiments were conducted in the lubricant BOT 350 M3, and the C experiments were conducted in the lubricant BOT 402.

Figure 2:
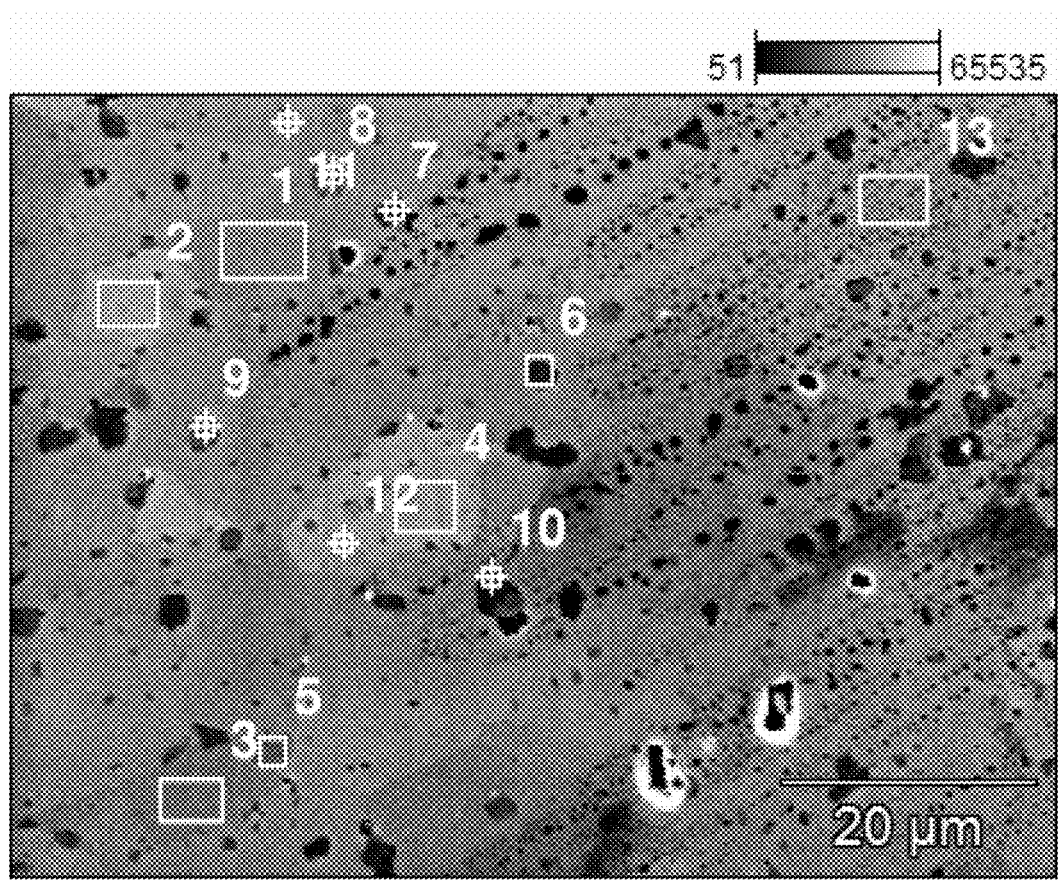
FIG. 2 shows a scanning electron micrograph of a semifinished product produced from the alloy of FIG. 1 with labeled measurement points for analysis by x-ray photoelectron spectroscopy.

The amount of free silicon not bound in the form of silicides was determined by scanning electron micrographic (SEM) studies on a semi-finished product produced from the alloy according to the present disclosure. FIG. 2 shows a micrograph with labeled measurement points for analysis by x-ray photoelectron spectroscopy (EDX). The following table shows the amount of free silicon for a selected measurement point/measurement surfaces, determined in this context so that these measurement points can be assigned to the alloy matrix and are thus outside of the intermetallic hard phases:

| Measurement point | Si |
|---|---|
| 2 | 0.74 |
| 3 | 0.78 |
| 4 | 0.79 |
| 7 | 0.95 |
| 12 | 0.80 |
| 13 | 0.68 |

Furthermore, scanning electron micrographic studies that are not presented here in detail were conducted, confirming accordingly the SEM-EDX measurements over the entire range of selected alloy compositions. A free silicon content of at least 0.6% by weight was measured.

Figure 3:
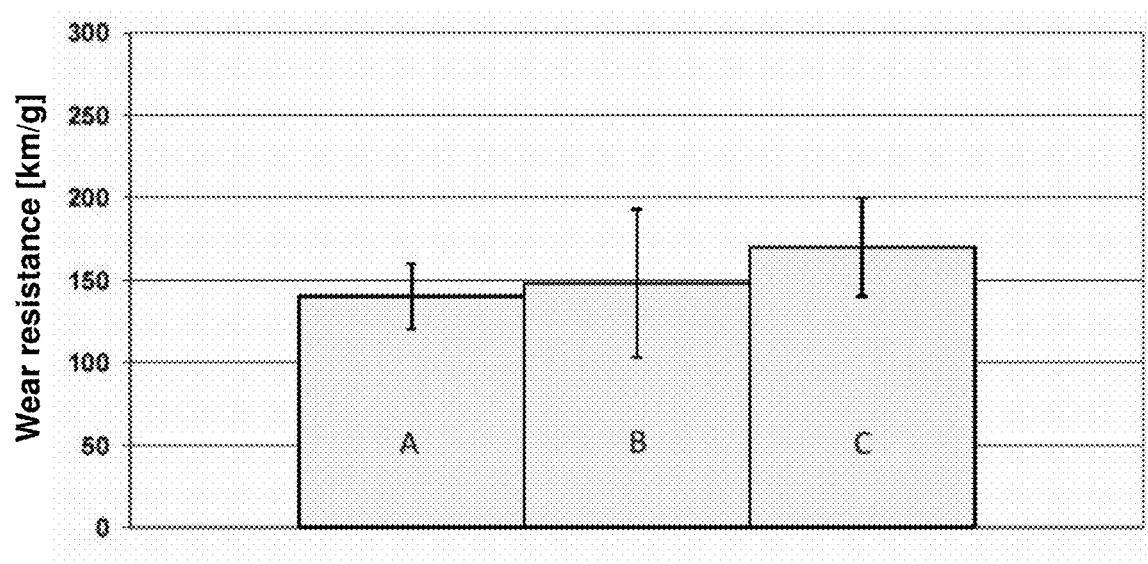
FIG. 3 shows the results of wear experiments with the alloy of FIG. 1 in the lubricants A, B, and C of FIG. 1.

FIG. 3 shows the results of wear experiments with the experimental alloy in the lubricants mentioned above, namely A (titanium EG 52512), B (BOT 350 M3) and C (BOT 402) which had the broadband oil compatibility. In all lubricant systems, the buildup of a stable reaction layer was detected, with the experiments being carried out at an oil temperature of 80° C., a surface pressure of 50 MPa and a sliding speed of 1 m/s. After traveling a friction distance of 100 km, the wear resistance values were within a relatively narrow range of 140-170 km/g. It was surprising to find that in the wear experiments already described, the sample piece not only exhibited a particularly broadband oil compatibility but also the respective wear resistance was high and the range covered by the wear resistance values thus determined is quite narrow, despite the use of different varieties of oil.

Comparative results can also be achieved in Pb-free variants. Alloys of the Pb-free variants are ultimately suitable for production of semi-finished products or components for the same intended uses as the Pb-containing alloy variants described above, but they also have the advantage that they are free of Pb. This is required mainly for environmental safety reasons.

According to one embodiment, an alloy composition having the following elements indicated in % by weight would be suitable for this purpose:

| | |
|---|---|
| 59-62% | copper |
| 3.5-4.5% | aluminum |
| 1.2-1.8% | silicon |
| 2.5-3.9% | nickel |
| 0.7-1.1% | iron |
| 0.7-1.0% | manganese |
| 0.05-0.5% | tin |
| ≤1.5% | chromium |
| ≤0.1% | lead |
| remainder | zinc plus other unavoidable impurities, | wherein free silicon is present in the amount of at least 0.4%, preferably at least 0.5% and especially preferably at least 0.6%, in the alloy matrix or in non-silicide phases containing silicon.

Oil compatibility tests were performed using this alloy group on the basis of two different types of alloys that differ from one another with regard to their nickel and aluminum content. It is interesting that the oil compatibility results achieved with these alloys show that, despite the absence of lead as an alloy ingredient, the oil compatibility corresponds to that found for the alloy containing Pb described above. These are the types of Pb-free alloys that were tested (amount in % by weight), wherein free silicon is preferably present in the alloy matrix or in non-silicide phases containing silicon in the amount of least 0.4%, preferably at least 0.5% and especially preferably at least 0.6%:

Alloy Type 1

| | |
|---|---|
| 59.5-61.5% | copper |
| 3.6-4.2% | aluminum |
| 1.2-1.8% | silicon |
| 2.8-3.3% | nickel |
| 0.7-1.1% | iron |
| 0.6-1.2% | manganese |
| ≤0.28% | tin |
| <0.1% | lead |
| remainder | zinc plus unavoidable impurities. |

Alloy Type 2

| | |
|---|---|
| 58.5-61.0% | copper |
| 3.9-4.4% | aluminum |
| 1.2-1.8% | silicon |
| 3.3-4.0% | nickel |
| 0.7-1.1% | iron |
| 0.6-1.2% | manganese |
| ≤0.28% | tin |
| <0.1% | lead |
| remainder | zinc plus unavoidable impurities. |

A sample of alloy type 1 was tested specifically with regard to its oil compatibility and found to have the following composition (amount in % by weight):

| | |
|---|---|
| 60% | copper |
| 4.0% | aluminum |
| 1.6% | silicon |
| 3.2% | nickel |
| 0.9% | iron |
| 0.9% | manganese |
| 0.2% | tin |
| 0.02% | lead |
| remainder | zinc plus unavoidable impurities. |

The composition of the sample tested from alloy type 2 had the following composition (amounts in % by weight):

| | |
|---|---|
| 60% | copper |
| 4.2% | aluminum |
| 1.6% | silicon |
| 3.7% | nickel |
| 0.9% | iron |
| 0.9% | manganese |
| 0.2% | tin |
| 0.02% | lead |
| remainder | zinc plus unavoidable impurities. |

Bushings as bearing parts could be produced from such an alloy with the process steps that are known per se. This includes the following steps:

Pressing the preliminary pipe material;

Soft annealing of the pressed preliminary pipe material;

Cold drawing of the soft annealed preliminary pipe material by max. 5%, preferably by 2 to 3%; and Thermal decomposition of the cold drawn semi-finished product.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, although the present invention has been specifically disclosed by preferred embodiments and optional features, modification and variation of the concepts herein disclosed may be resorted to by those skilled in the art, and that such modifications and variations are considered within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

The invention claimed is:

1. A copper alloy component wherein the component is lubricant-compatible, and wherein the component has a composition consisting of:

| | |
|---|---|
| 54-65% | copper by weight, |
| 2.5-5.0% | aluminum by weight, |
| 1.0-3.0% | silicon by weight, |
| 2.0-4.0% | nickel by weight, |
| 0.1-1.5% | iron by weight, |
| ≤1.5% | manganese by weight, |
| ≤1.5% | tin by weight, |
| ≤1.5% | chromium by weight, |
| ≤1.5% | cobalt by weight, |
| ≤0.1% | lead by weight, |
| remainder | zinc plus other unavoidable contaminants; | wherein the component contains aluminum intermetallic phases;
wherein the component has free silicon is-present in an alloy matrix or in silicon-containing non-silicide phases in an amount of, by weight, at least 0.4% and at most 2%, and the weight ratio between zinc and free silicon is 15 to 75; and
a β phase is present in an amount greater than 80% and there are no γ phases containing silicon.

2. The component of claim 1, having, by weight, 3.0-5.0% aluminum, 0.5-1.5% iron and ≤0.7% tin.

3. The component of claim 1, having, by weight, 56-60% copper, 3.0-4.0% aluminum, 1.3-2.5% silicon, 3.0-4.0% nickel, 0.5-1.5% iron, and 0.3-0.7% tin.

4. The component of claim 1, having, by weight, 59-62% copper, 3.5-4.5% aluminum, 1.2-1.8% silicon, 2.5-3.9% nickel, 0.7-1.1% iron, 0.7-1.0% manganese and 0.05-0.5% tin.

5. The component of claim 1, wherein the amount of free silicon is, by weight, at least 0.65% and at most 2%.

6. The component of claim 1, wherein the weight ratio between zinc and free silicon is in the range of 20 to 55.

7. The component of claim 1, wherein the amount of aluminum exceeds the stoichiometric ratio of the sum of the iron, manganese, nickel and chromium amounts.

8. The component of claim 1, wherein a weight ratio of the sum of the elements Ni+Fe+Mn to Si is ≤3.45 and ≥0.7.

9. The component of claim 8, wherein the weight ratio is ≤3.25 and ≥0.7.

10. The component of claim 1, wherein the component has a reaction layer on an outer surface of the component with free silicon present as a reactive element in the alloy matrix or in silicon-containing non-silicide phases.

11. The component of claim 1, wherein the component is a synchronizer ring for a gear.

12. The component of claim 1, wherein the component is arranged in a gear oil, the component having a reaction layer on a surface which is exposed to friction, with additives present in the gear oil and free silicon present as a reactive element in the alloy matrix or in silicon-containing non-silicide phases or reaction products and/or decomposition products thereof.

13. The component of claim 12, wherein the component is a synchronizer ring for a gear.

14. The component of claim 1, wherein the component is treated with at least one heat treatment step with subsequent cooling such that the amount of free silicon in the alloy matrix or in silicon-containing non-silicide phases is, by weight, at least 0.4% and at most 2%.

15. The component of claim 14, wherein process management of the at least one heat treatment step and subsequent cooling provides β phase in an amount greater than 80%.

* * * * *